United States Patent [19]

Narita

[11] Patent Number: 4,836,790
[45] Date of Patent: Jun. 6, 1989

[54] HEADER DEVICE

[75] Inventor: Hiroshi Narita, Tokyo, Japan

[73] Assignee: E. I. Du Pont de Nemours and Company, Wilmington, Del.

[21] Appl. No.: 116,586

[22] Filed: Nov. 4, 1987

[30] Foreign Application Priority Data

Nov. 7, 1986 [JP] Japan ............... 61-171260

[51] Int. Cl.[4] .............................. H05K 1/00
[52] U.S. Cl. ...................... 439/68; 439/159
[58] Field of Search ............ 439/152, 153, 155, 156, 439/157, 159, 160, 180, 259, 261, 264, 266, 267, 330, 331, 341, 525, 526, 55, 68, 70–74

[56] References Cited

U.S. PATENT DOCUMENTS

| 4,193,656 | 3/1980 | Ward | 439/152 |
| 4,196,954 | 4/1980 | Collignon | 439/152 |
| 4,241,966 | 12/1980 | Gomez | 439/157 |
| 4,402,563 | 9/1983 | Sinclair | 439/264 |
| 4,531,795 | 7/1985 | Sinclair | 439/152 |
| 4,669,796 | 6/1987 | Carter | 439/71 |

Primary Examiner—David Pirlot

[57] ABSTRACT

A header device for receiving an IC card or pack, comprises a housing, which includes an IC-pack holder having an opening through which the IC pack is inserted into and removed from the housing, and a pair of first levers projecting into the IC-pack holder so as to abut an end portion of the IC pack, and a pair of second levers located outside the holder. The first and second levers are coupled to each other at their respective proximal ends, so that they are immovable relative to each other. The coupled levers are rotatably mounted on the housing. If the IC pack is inserted into the housing through the opening, the end portion of the IC pack pushes the respective first levers, thereby rotating both the first and second levers in a first rotation direction. Then, if the second levers are rotated in a second rotation direction reverse to the first rotation direction, the first levers push the IC pack out of the housing.

10 Claims, 2 Drawing Sheets

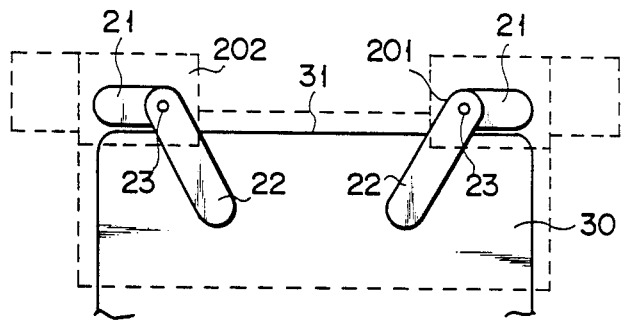
F I G. 3A
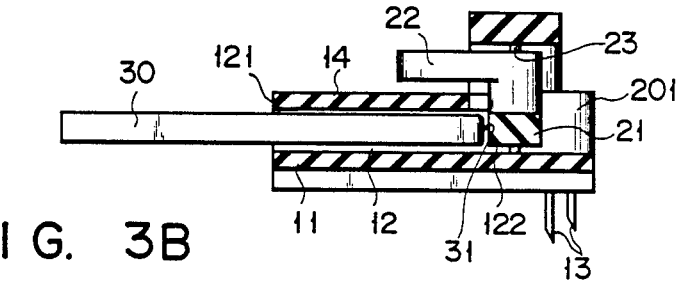
F I G. 3B
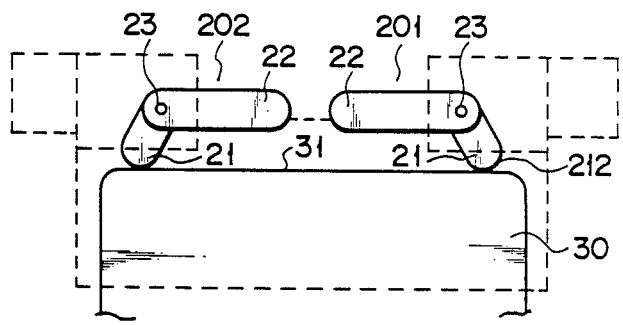
F I G. 4A
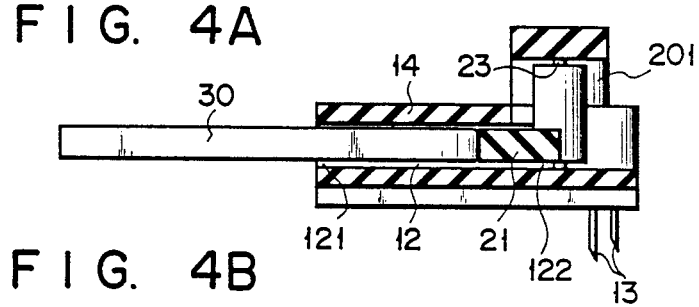
F I G. 4B

HEADER DEVICE

BACKGROUND OF THE INVENTION

1. Field of the Invention

The present invention relates to a header device, and more particularly, to a header device which connects an IC pack, having a semiconductor circuit therein, to another semiconductor circuit.

2. Description of the Prior Art

Header devices of this type are used to connect a flat IC pack or card to an external circuit, such as a circuit of a main apparatus. The IC pack contains a semiconductor circuit, e.g., a memory, CPU, etc. These conventional header devices are arranged so that the IC pack can be inserted into an IC-pack holder of a header housing, which is formed of an insulator. A number of conductive pins are arranged on an interior end face of the housing opposite to an open face thereof. The connector pins are connected to or disconnected from their corresponding socket terminals, which are located on the leading end portion of the IC pack. Thus, the IC pack can be connected to or disconnected from the external apparatus by inserting it into or drawing it out from the IC-pack holder of the header housing.

In the prior art header devices described above, a considerable force is required to remove the connector pins on the header housing from the socket terminals on the IC pack, in order to secure satisfactory electrical contact between them. These pins and terminals have come to be arranged with a higher density, with the increase of the packaging density of those semiconductor circuits which carry them.

The IC pack is pulled by hand when it is to be removed from the header housing. However, a number of connector pins and socket terminals are arranged densely, and the disconnection of the pins from the terminals requires a substantial force. In removing the IC pack from the housing, therefore, the pack must be pulled with a great force, against the fitting friction between the pins and terminals. Since the IC pack is removed manually, moreover, the direction of the removal is not fixed, so that the pins or terminals may possibly be broken or bent.

SUMMARY OF THE INVENTION

Accordingly, an object of the present invention is to provide a header device which permits easy removal of an IC pack therefrom, and more specifically, facilitates the removal of the IC pack despite the use of a number of connector pins. Another object of the invention is to provide a header device which permits the removal of the IC pack without entailing any damage to the pins or terminals.

The above objects of the present invention are achieved by a header device for a flat IC pack having at least one electrical terminal, the header device comprising a header housing including an IC-pack holder, an opening communicating with the IC-pack holder so that the IC pack is loaded or unloaded through the opening, and an electrical terminal adapted to fittingly engage the electrical terminal of the IC pack in the IC-pack holder; at least one operating means including a first free end located inside the IC-pack holder of the header housing, a second free end located outside the IC-pack holder, and support means rotatably supporting the first and second free ends so that the second free end rotates as the first free end rotates, wherein the first free end rotates as the IC pack is inserted into the IC-pack holder, and the second free end is rotated in order that the IC pack in the IC-pack holder of the header housing is pushed in the direction opposite to the insertion direction, by the second free end.

In the header device of the invention constructed in this manner, if the IC pack is pushed deep into the IC-pack holder of the header housing, a first lever, having the first free end, is pushed and rotated rearward by the pack. At the same time, a second lever, having the second free end, rotates forward or toward the opening in the IC-pack holder. If the second lever is rotated rearward, the first lever moves toward the opening in the IC-pack holder. After the IC pack is pushed out by the first lever, moving in this manner, it can be removed from the header housing.

Thus, with use of the header device constructed in this manner, the IC pack can be both inserted and removed by a pusing operation.

BRIEF DESCRIPTION OF THE DRAWINGS

FIGS. 3A and 3B show a state such that an IC pack is fully inserted in the header device of FIG. 1, in which FIG. 3A is a schematic top view, and FIG. 3B is a sectional view taken along line X—X of FIG. 1; and FIGS. 4A and 4B, which correspond to FIGS. 3A and 3B, respectively, show a state such that the IC pack is pushed out of the header device by operating means according to the invention.

DETAILED DESCRIPTION OF THE PREFERRED EMBODIMENTS

Figure 1:
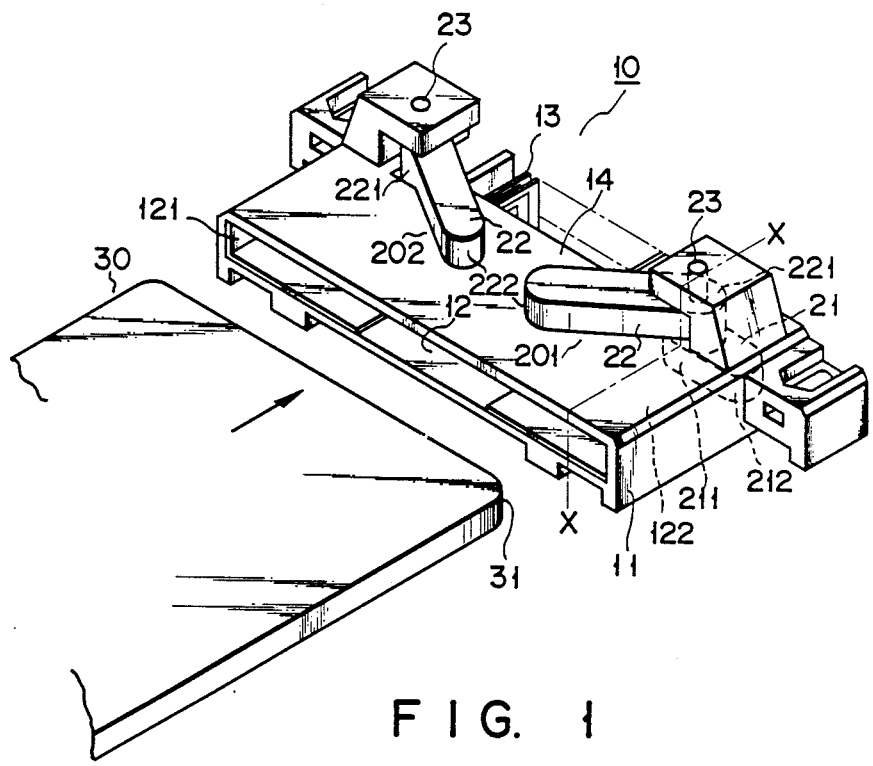
FIG. 1 is a perspective view of a header device according to an embodiment of the present invention.

A header device according to an embodiment of the present invention will now be described in detail with reference to the accompanying drawings. In the external perspective view of FIG. 1, header device 10 is composed basically of housing 11. Defined inside header housing 11 is IC-pack holder 12 in which IC pack 30 is to be held. A plurality of conductive pins 13 are arranged on that wall which is opposite to opening 121 of holder 12. Pins 13 are adapted to be connected individually to socket terminals (not shown), which are fixed to the leading end portion 31 of IC pack 30 in holder 12. Thus, if pack 30 is inserted into holder 12 through opening 121, a semiconductor circuit mounted on pack 30 is connected to the circuit of a main apparatus (not shown) to which header device 10 is attached by pins 13.

Figure 2:
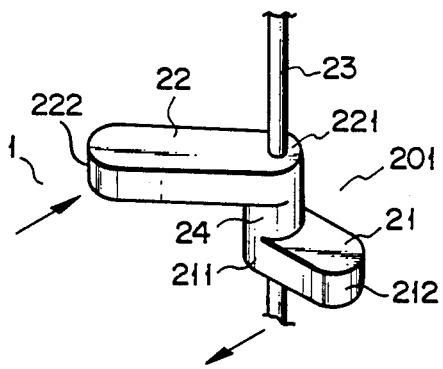
FIG. 2 is a perspective view showing operating means of the header device of FIG. 1.

Header housing 11 is provided with a pair of operating means 201 and 202 which are situated individually on two opposite sides of IC pack 30, with respect to the insertion direction thereof, at interior portion 122 of IC-pack holder 12. As shown in FIG. 2, operating means 201 includes first and second levers 21 and 22 which are connected, at connecting ends 211 and 221, respectively, to coupling portion 24. First lever 23 has free end 212. Second lever has free end 222. Operating means 202 is also constructed in this manner. Operating means 201 and 202 are fitted individually in a pair of apertures on IC-pack holder 12.

Operating means 201 and 202 are rotatably supported by their corresponding shafts 23, which are mounted on housing 11 so as to extend perpendicular to the plane of IC pack 30 which plane is defined by a longitudinal leading edge of the IC pack and the direction of IC pack insertion. First levers 21 are designed so that they can move from interior portion 122 of IC-pack holder 12 toward opening 121 (and in the reverse direction) when operating means 201 and 202 rotate. Second levers 22 are designed so as to rotate over top wall 14 of housing 11 as the operating means rotate.

In this embodiment, first and second levers 21 and 22 are fixed at an angle of about 120° to each other, as shown in FIG. 2. When second lever 22 is rotated in the direction indicated by an arrow 1 in FIG. 2, first lever 21 moves in the direction opposite to the moving direction of the second lever. Second lever 22, which is used as an operating piece, is longer than first lever 21 which serves as a driving piece. In accordance with the ratio between the radii of the rotation of levers 21 and 22, the operative force of first lever 21 is enhanced by second lever 22, and is then transmitted as a driving force for IC pack 30.

In the header device constructed in this manner, if IC pack 30 is pushed manually into IC-pack holder 12 through opening 121, leading end face 31 of pack 30 first abuts against free end 212 of each first lever 21. If pack 30 continues to be pushed in further, first lever 21 is pushed deep into holder 12, and second lever 22, which is formed integrally with the first lever, moves towards opening 121. FIGS. 3A and 3B show a state after IC pack 30 is inserted. In this state, the socket terminals (not shown) of pack 30 and the connector pins 13 of header device 10 are connected.

In removing IC pack 30, second levers 22 of operating means 201 and 202 are pushed in the direction of pack insertion. As levers 22 rotate in this manner, free ends 212 of first levers 21 push IC pack 30 toward opening 121 so that pack 30 further projects from the housing, as shown in FIGS. 4A and 4B. In this state, the conductive pins 13 of device 10 are off the socket terminals of pack 30, so that the pack can be removed easily by hand.

In the header device according to the embodiment described above, the IC pack can be inserted by being pushed in, and can be removed by pushing second levers 22. In general, a pushing operation is easier than a pulling operation. Thus, the IC pack can be inserted and removed more efficiently. In this embodiment, in particular, second lever 22 is longer than first lever 21, so that it can be operated easily, even if the number of the conductive pins of the header device is so large that a great force would be required for the removal. The respective second levers of the paired operating means can be operated simultaneously by means of one suitable operating member located halfway between the operating means.

The operating means of the header device of the present invention may be one in number. In this case, it is situated in a position such that the IC pack can be removed easily by operating the second lever.

What is claimed is:

1. A header device for a flat IC pack having at least one electrical terminal, comprising:

a header housing including an IC-pack holder, an opening, communicating with the IC-pack holder so that the IC pack is inserted or withdrawn through the opening, and an electrical terminal adapted to fittingly engage the electrical terminal of the IC pack in the IC-pack holder; and at least one operating means including a first free end located inside the IC-pack holder of the header housing, a second free end located outside the IC-pack holder, and support means rotatably supporting the first and second free ends so that the second free end rotates as the first free and rotates, said first free end being rotated as the IC pack is inserted into the IC-pack holder in a first direction, and said second free end being rotated by a force acting in the first direction in order that the IC pack in the IC-pack holder of the header housing is pushed in the direction opposite to the first direction, by the first free end.

2. A header device according to claim 1, wherein said operating means includes a first lever having the first free end, at one end thereof, and a first connecting end, and a second lever having the second free end, at one end thereof, and a second connecting end; and said support means includes a coupling member having an axis, said first and second levers extending from the coupling member.

3. A header device according to claim 2, wherein said first and second levers and said coupling member of said support means are molded integrally.

4. A header device according to claim 2, wherein said first and second levers and said coupling member of said support means are formed of an insulating material.

5. A header device according to claim 2, wherein the distance between the free end and the connecting end of said first lever is shorter than that between the free end and the connecting end of said second lever.

6. A header device according to claim 2, wherein said first free end includes an arcuate surface against which the IC pack abuts, the point of contact between the IC pack and the arcuate surface being adapted to move as the IC pack moves.

7. A header device according to claim 2, wherein said header housing includes a pair of said operating means, each operating means being spaced from the other operating means in a direction perpendicular to the direction of IC-pack insertion.

8. A header device according to claim 2, wherein said first and second levers extend on a plan parallel to the plane of the IC pack, and said axis of said coupling member extends perpendicular to the plane of the IC pack, said plane of the IC pack being the plane defined by a longitudinal leading edge of the IC pack and the direction of IC pack insertion into the IC pack holder.

9. A header device according to claim 8, wherein said operating means includes a shaft extending along the axis of the coupling member, and supporting the coupling member so that the first and second free ends are movable.

10. A header device according to claim 8, wherein said first and second levers extend in different directions, at a predetermined angle to each other.

* * * * *